(12) United States Patent
Gupta et al.

(10) Patent No.: US 6,236,589 B1
(45) Date of Patent: May 22, 2001

(54) ULTRA HIGH DENSITY STORAGE MEDIA AND METHOD THEREOF

(75) Inventors: Arunava Gupta, Valley Cottage; Ravi Saraf, Briarcliff Manor, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/320,611

(22) Filed: May 26, 1999

Related U.S. Application Data

(62) Division of application No. 08/960,693, filed on Oct. 29, 1997, now Pat. No. 6,017,618.

(51) Int. Cl.$^7$ .................................................. G11C 11/00
(52) U.S. Cl. ............................................. 365/151; 365/106
(58) Field of Search .................................... 365/151, 106; 428/321.1, 19, 64

(56) References Cited

U.S. PATENT DOCUMENTS 4,981,743 * 1/1991 Ho ........................................... 428/64
5,301,145 * 4/1994 Inoue et al. .......................... 365/106
5,557,596 * 9/1996 Gibson et al. ....................... 365/151

* cited by examiner

Primary Examiner—Son T. Dinh
(74) Attorney, Agent, or Firm—Scully, Scott, Murphy & Presser; Robert M. Trepp, Esq.

(57) ABSTRACT

A storage media for storing information having a substrate. The substrate has an upper surface and a molecular weight greater than 5,000. Preferably the material is a polymer. The material has a plurality of piles of molecular chains in selected areas formed by pushing the molecular chains of the material on its upper surface to the selected area mechanically with a mechanical tool. The piles represent written information. The mechanical tool is preferably an atomic force microscope. Another aspect of the present invention is a method for storing information having the steps of selecting a material substrate having an upper surface and pushing molecules on the upper surface into a molecular pile at selected locations.

6 Claims, 10 Drawing Sheets

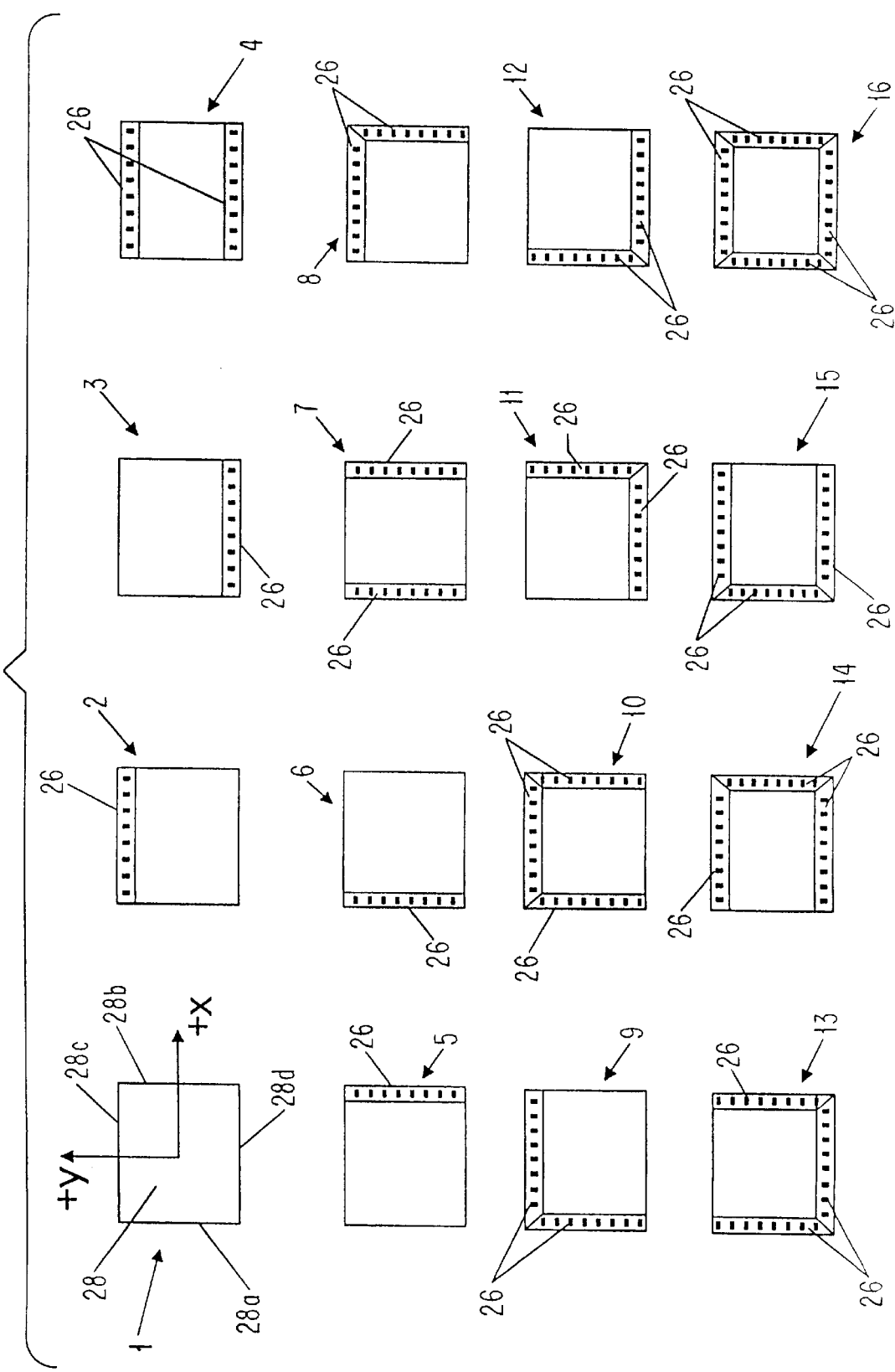

ULTRA HIGH DENSITY STORAGE MEDIA AND METHOD THEREOF

CROSS REFERENCE TO RELATED APPLICATION

The present application is a divisional of application Ser. No. 08/960,693 filed Oct. 29, 1997, now U.S. Pat. No. 6,017,618.

RELATED APPLICATIONS

U.S. application Ser. No. 08/960,694, entitled "MICRO GONIOMETER FOR SCANNING PROBE MICROSCOPY," filed on even date herewith for Ravi Saraf and Arunava Gupta is incorporated herein by reference.

BACKGROUND OF THE INVENTION

1. Field of the Invention

The field of art to which this invention relates is ultra high density disk storage. Specifically, this invention relates to a method for writing data to a material by manipulating long chain molecules on the material's surface.

2. Description of the Related Art

With the advent of scanning tunneling microscopes (STM) in the early 1980's, several methods have been developed to use the small scale processing capability of the STM for high density data storage. In these methods, atoms are manipulated to form bumps on a media surface, the bump forms a bit of information which is represented in a base two (binary) format (i.e., as a 1 or a 0). An example of such a use is disclosed in U.S. Pat. No. 5,327,625 to Clark et al. Although these methods have their advantages, such as high storage density, they are plagued by several disadvantages.

The main disadvantage of STM data storage is that the speed of writing and replication is prohibitively slow. Conventional magnetic and CD-ROM recording rates are approximately $10^8$ and $1.5 \times 10^6$ bits/second respectively, while STM atom writing is less than 1 bit/second.

Additionally, writing at the atomic level is usually performed at very cold temperatures and in a vacuum. The equipment used to perform atomic scale writing is therefore very sophisticated and expensive. There are also disadvantages in reading the information written at the atomic level. Atomic scale resolution of the media surface is necessary to read the data. This also requires sophisticated and expensive equipment.

Lastly, the scanning probe processes of the prior art need to write onto single crystal surfaces. Materials of this type are expensive and greatly limit the process by requiring materials of this class.

For the above reasons, there is a need in the art for a high density method of writing to the surface of a material which does not suffer from the drawbacks associated with manipulation of atoms on that surface.

SUMMARY OF THE INVENTION

Therefore, it is an object of the present invention to provide a method for ultra high density media storage which can be performed at rates comparable with those associated with conventional magnetic and CD-ROM recording rates.

Another object of the present invention is to provide a method for ultra high density media storage in which writing to the media is performed at room temperature and atmospheric pressure.

Yet another object of the present invention is to provide a method for ultra high density media storage in which reading of the data is accomplished with conventional inexpensive equipment.

Yet another object of the present invention is to provide a method for writing to a substrate surface with a scanning probe microscope in greater than base two writing.

Yet another object of the present invention is to provide a method for ultra high density media storage in which inexpensive substrate materials are used.

Yet still another object of the present invention is to provide a method for ultra high density media storage in which surface features are created where the shape of the feature is controlled. Accordingly, a storage media for storing information is disclosed. The storage media comprises a substrate having a material with a molecular weight greater than 5,000 on its upper surface, preferably the material is a polymer. The material has a plurality of piles of molecular chains in selected areas formed by pushing molecular chains of the polymer on the surface to the selected area mechanically with a mechanical tool whereby information is written therein. The mechanical tool is preferably an atomic force microscope (AFM).

Also disclosed is a molecular bar-code comprising a substrate having a material with a molecular weight greater than 5,000 on its upper surface. The material has a plurality of piles of molecular chains in selected areas forming a series of parallel lines. The piles are formed by pushing molecular chains of the material on the surface to the selected areas with a mechanical tool whereby information is written on the substrate.

Another aspect of the present invention are methods for storing information comprising the steps of selecting a material substrate having an upper surface and pushing long chain molecules on said upper surface into a molecular pile at selected locations.

BRIEF DESCRIPTION OF THE DRAWINGS

These and other features, aspects, and advantages of the apparatus and methods of the present invention will become better understood with regard to the following description, appended claims, and accompanying drawings where:

FIG. 5 illustrates a chart showing the sixteen bit pile combinations achievable with the present invention.

DETAILED DESCRIPTION OF THE PREFERRED EMBODIMENTS

An STM can be used to move atoms or molecules around on an electrically conductive surface (i.e., substrate) by moving the tip of the STM to a position adjacent to the atom or molecule to be moved and subsequently increasing the attraction between the tip and the atom or molecule by moving the tip closer to the surface. Then, while the atom or molecule remains bound to the tip and to the surface of the substrate, the tip can be moved laterally to drag the atom or molecule to a desired position on the substrate surface. The tip can then be moved away from the surface, reducing the attraction between the atom or molecule and tip, and leaving the atom or molecule bound at the desired position. However, the speed of this process is limited.

The speed of thermo-mechanical AFM (a good discussion of which is found at H. J. Mamin, D. Ruger, *Access: Selected Topics in Storage Technology*, Volume VII, Number 1, P. 1, 1993) can reach close to the $10^6$ bits/second range. In thermo-mechanical AFM, the writing is done by locally damaging the surface of a dielectric film by rapidly heating and cooling the AFM tip. In the present invention, a writing technique using AFM is disclosed where the tip is not used to damage the substrate surface, but to alter its topography. Furthermore, the surface modification leads to base sixteen writing in contrast to base two writing which is typical of thermo-mechanical AFM.

Figure 1A:
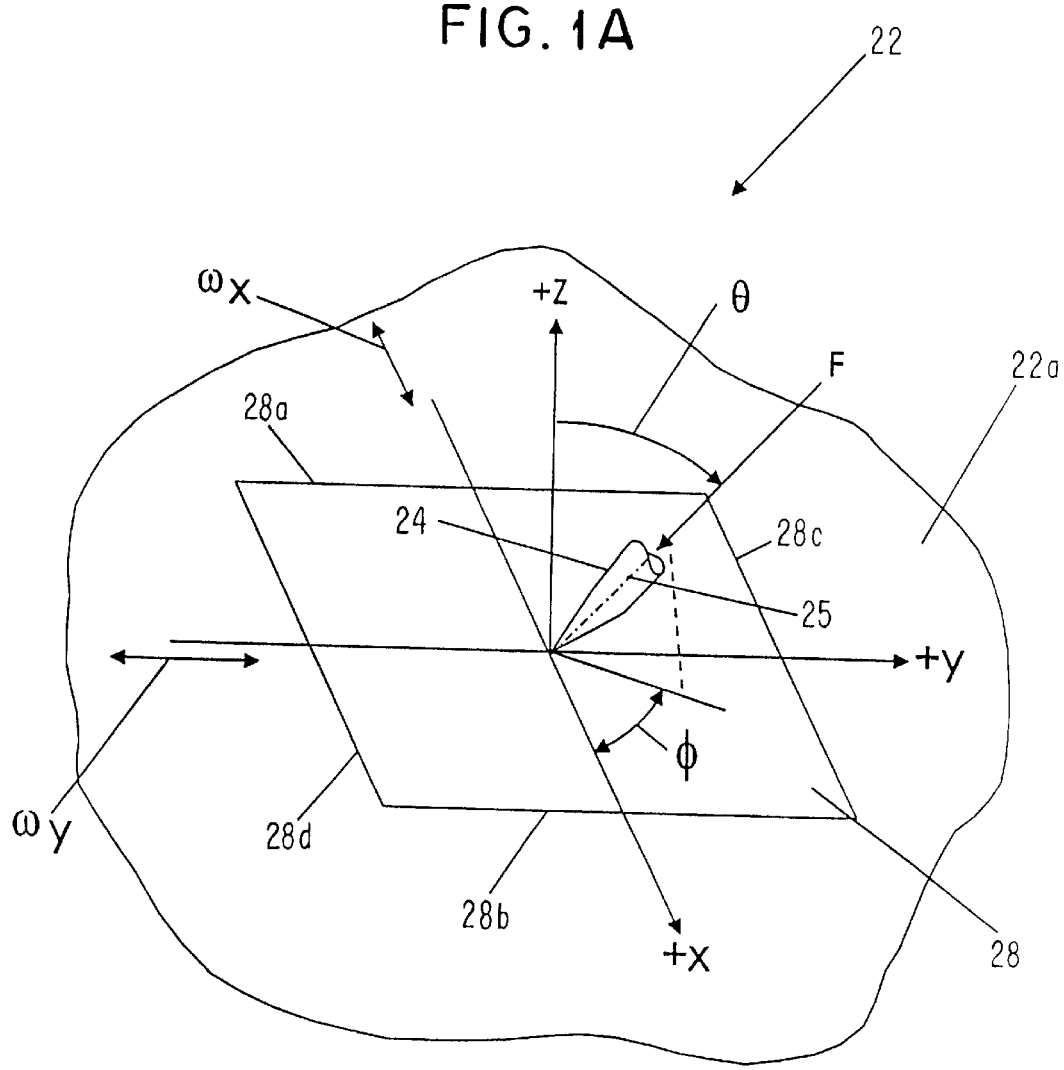
FIG. 1A illustrates an isometric view of an AFM tip operating on a pixel of media surface.
Figure 1B:
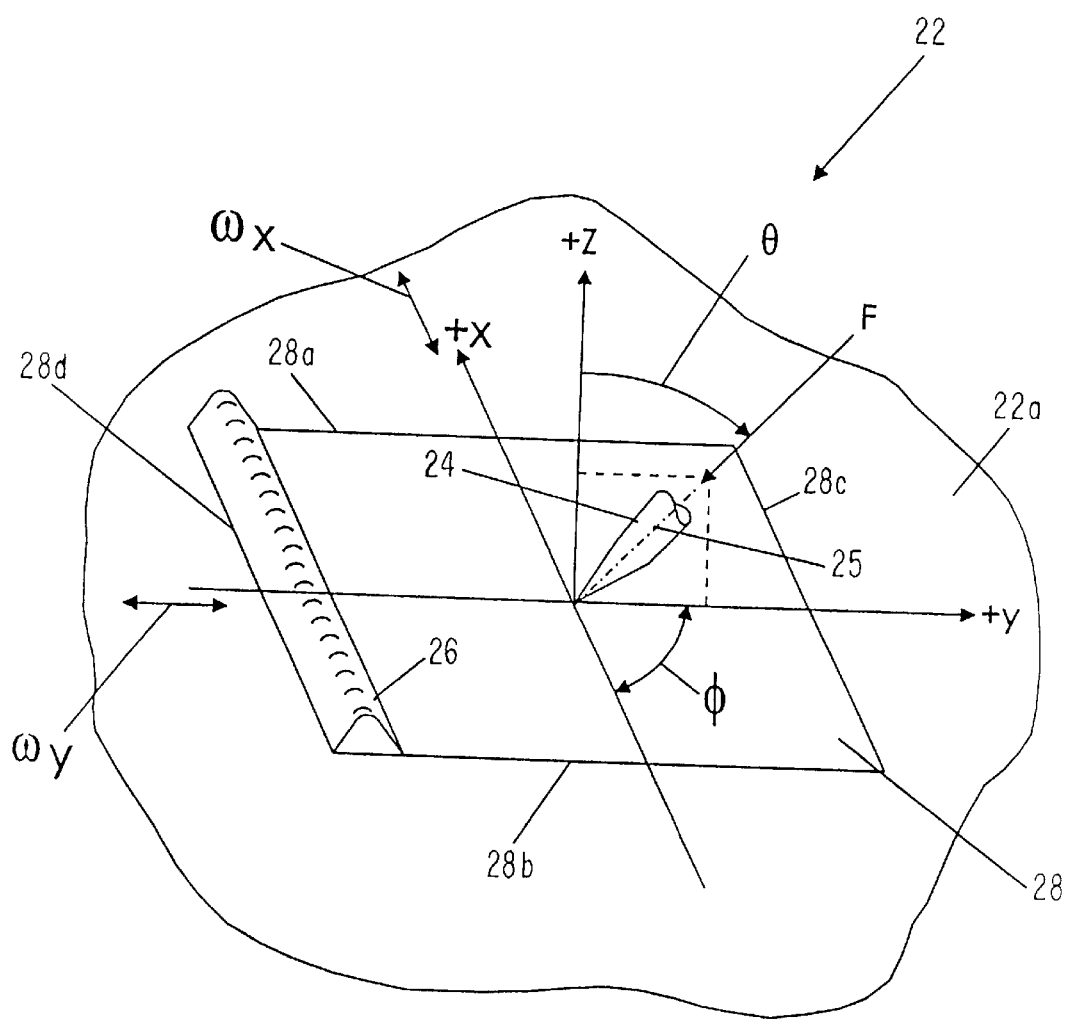
FIG. 1B illustrates the AFM of FIG. 1A in which a molecular pile is formed on the negative y axis of the surface pixel.

Referring now to FIGS. 1A and 1B, the basic method for writing involves pushing long chain molecules of a substrate material 22 with an AFM tip 24 and accumulating the long chain molecules to form one or more molecular piles 26. The height of the pile 26 depends upon the amount of material pushed and is related to the area swept by the tip 24, the dynamical properties of the long chain molecules, and the processing conditions (i.e., normal force of the tip, the tip angle, and the speed of sweeping). To avoid any dissipation of pile 26, a material must be chosen with molecules that are "frozen" at the writing temperature ($T_w$), the writing temperature is the temperature at which the substrate is written to.

The glass transition temperature ($T_g$) is a second order transition where there is a discontinuous change in coefficient of thermal expansion and specific heat. In practical terms, it is the temperature where a glassy phase of the material softens. Therefore, for amorphous polymers, at temperatures above the glass transition temperature ($T_g$) the material will be significantly soft such that the piles 26 can be "leveled" (i.e., erased) in some predetermined time. Below the $T_g$, the molecular chains are "frozen" and the piles 26 will not dissipate.

Preferably, a polymer is used as the substrate material. Two types of polymer substrates can be used, amorphous polymers and semicrystalline polymers. A semi-crystalline polymer's melting point temperature ($T_m$) is defined as the temperature at which a semi-crystalline polymer melts. The storage temperature of a polymer substrate ($T_s$), is the temperature at which a polymer is stored after writing, and at which the piles will not dissipate.

For an amorphous polymer, the writing temperature ($T_w$) should be below a temperature 100° C. higher than the glass transition temperature ($T_g$+100° C.), and preferably below the glass transition temperature ($T_g$) to keep the pile from dissipating once it is formed. Similarly, the storage temperature ($T_s$) should be below the glass transition temperature ($T_g$) so that the piles will not be erased during normal use and storage.

For a semicrystalline polymer, the writing temperature ($T_w$) and the storage temperature ($T_s$) should be below the melting point temperature ($T_m$) other wise the pile formed during writing will collapse. When the material has a glass transition temperature ($T_g$) below the writing temperature the writing can be done faster because it is easier to move the molecular chains. Examples of such materials are semicrystalline polymers such as polyolefins which include polyethylene, polypropylene and other polymers such as polytetrafloroethylene. In these molecular systems, the piles 26 will remain stable after writing because the polymer is crystalline at the writing temperature.

When the material has a glass transition temperature ($T_g$) which is above the writing temperature the chains can still be moved as discussed below. Here the pile 26 will be stable because they are "frozen". Examples of such materials are polymers such as polyimide, polyether, polyether ketone, polycarbonates, polystyrene, polymethyl, and polymethacrylate.

Since the typical size (i.e., radius of gyration) of a polymer coil is ~10–20 nm, an AFM is suitable to manipulate their molecules. Preferably, polyimide is used because in addition to the benefits discussed above, it also has a long life due to its resilience against corrosion, microbe attack and humidity, similar to that of diamond-like films. Additionally, polyimide can be easily processed into a very smooth film. However, any material having a molecular weight greater than 5,000 can be used as the substrate.

Additionally, photosensitive polymers can be used as the substrate. These are polymers which cross link or polymerize when exposed to electromagnetic radiation from the Infrared to the x-ray range. After writing on the surface of a photosensitive substrate, the material is cross linked, which means that the data written (i.e., the piles) will not move, or dissipate. Since the cross linking "gels" the piles on the substrate surface, the writing temperature ($T_w$) and storage temperature ($T_s$) can be above or below the glass transition temperature ($T_g$). Examples of photosensitive polymers are certain polyimides and certain epoxies. Cross linking can be achieved by methods known in the art, such as by light, chemically or thermally.

Another desirable characteristic of a material to be utilized in the present invention is a favorable orientation function. Orientation function is a parameter quantifying the extent of orientation of its molecular chains. The parameter ranges from 0 to 1. At 0, the chains are randomly oriented, and as a result the material is isotropic. At 1, the chains are perfectly oriented along an axis. It is preferable to use a material where the chains will be slightly oriented in the molecular pile 26. A slightly oriented material leads to higher contrast when a polarized light is used, which is an advantage when reading the pile data, however this is not a necessary condition. Preferably the orientation function is in the range of 0.3 to 1.

Referring again to FIGS. 1A and 1B, there is illustrated an AFM tip 24 in which the parameters essential to the method of the present invention are illustrated, namely, to create a molecular pile 26 on the surface 22a of a substrate material 22. A tip 24 is provided, having a tip force, F, along a tip axis 25. Typically, the tip force F is in the range of 100 nN. The tip 24 is scanned inside a bit or pixel 28 occupying a portion of the material surface 22a. The scanning takes place in the x-y plane at a corresponding frequency of $\omega_x$ and $\omega_y$, where $\omega_x$ is the scanning frequency parallel to the x-axis and $\omega_y$ is the scanning frequency parallel to the y-axis. The origin is defined as the location of the tip before scanning commences. This is preferably the center of the pixel 28. The pixel 28 is centered about the x-y plane and has sides 28a, 28b, 28c, and 28d. Side 28a corresponds to the side of the pixel on the negative x axis, side 28b corresponds to the side on the x axis, side 28c corresponds to the side on the y axis, and 28d corresponds to the side on the negative y axis.

Figure 2:
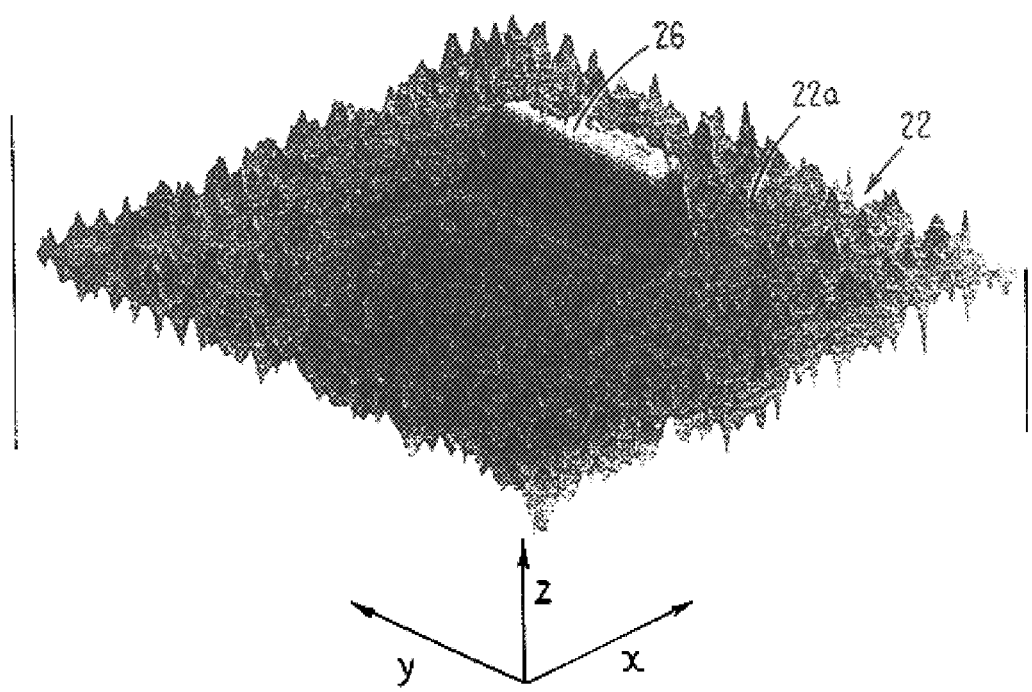
FIG. 2 illustrates a photograph of a molecular pile on a polyimide surface.

If $\omega_x$ is greater than $\omega_y$ the long chain molecules will be swept in the x-direction to form a molecule pile 26 with its long axis parallel to the y-axis, that is, either toward side 28a or 28b. The inverse situation would occur if $\omega_y > \omega_x$. A photograph of a molecular pile 26 on a material surface 22a is shown in FIG. 2.

Additionally, the angle θ the tip 24 makes with the z-axis and the azimuthal angle φ, defined as the angle between the positive x-axis and the projection of the tip axis 25 on the x-y plane, determine the direction the molecules will be pushed toward. In FIG. 1A the tip 24 is oriented in an arbitrary direction with φ between 0° and 90° and θ between 0° and 90°. In order to create piles parallel to the x- and/or y-axis θ is preferably always between 0° and 90°, and φ is preferably equal to 0°, 90°, 180° or 270°.

Figure 3:
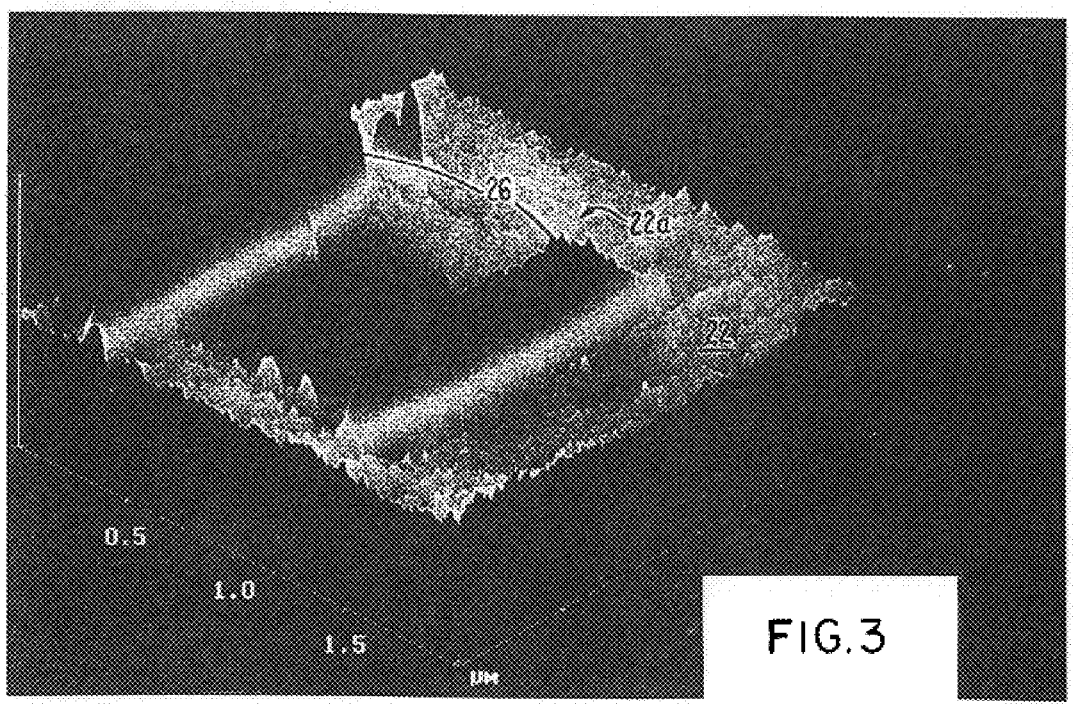
FIG. 3 illustrates a photograph of two molecular piles formed on both sides of the AFM tip.

FIG. 1B illustrates the situation where φ is equal to 90° (i.e., toward the positive y-axis, as shown in FIG. 1B), the tilt angle θ≧5°, and $\omega_y > \omega_x$. In this situation the long chain molecules will then be pushed along the y-axis and the pile 26 will be formed parallel to the x-axis, and on the negative side of the y-axis, designated as side 28d. Under the condition where θ~0, the molecule pile 26 will form on both sides of the high frequency sweep direction, as shown in FIG. 3.

Using a polymer, such as polyimide, the height of the pile 26 is greater then 10 nm, and using the process as described, the location of the pile 26 can be controlled with a very high degree of accuracy. It is therefore possible to write to a material's surface 22a, such as a storage disk, and to replicate disks from a master disk using conventional, inexpensive techniques similar to those used in audio disc production.

In order to be able to quickly detect (i.e., read) the piles 26 on the material's surface 22a the piles 26 must be prominent in size. However, as the pile 26 size increases in size, the writing speed and storage density decreases. To achieve both fast writing time and high storage density, it has been found that the root mean square roughness of the material's surface 22a should be less than 100 nm, and preferably less than 5 nm. The root mean square roughness is calculated by first calculating the average of square of the height of the hills and valleys from a base plane. The root mean square roughness is the square root of that average. The base plane is typically defined as the plane (parallel to the surface) about which the same amount of material is above (i.e., hill) and below (i.e., valley). The root mean square roughness is typically measured using well known reflectivity methods known in the art.

Easy and inexpensive replication is not possible with other methods involving AFM because the writing is done by damaging the substrate surface where the shape of the feature is not well controlled and the size is not prominent enough to permit easy detection.

To further enhance the speed of writing, the surface 22a can be modified by rapid annealing. Preferably the rapid annealing is accomplished by exposing the surface 22a to laser pulses. For a polymer, a laser pulse is used with the pulses length being in the preferred range of 10 ns to 1 ms at an energy below the ablation threshold. The surface is heated for a long enough time such that local mobility of the molecular chains is provided, but shorter than the Rouse time. The Rouse time is defined as the longest relaxation time of the molecule.

The high speed pulse from the laser heats up the surface molecules well above their glass transition temperature ($T_g$) causing them to move vigorously. Since the free volume of chain ends is larger than the rest of the molecule, the molecular system will rearrange by bringing their chain ends to the surface 22a. As a result, the molecules on the surface 22a will have a higher free volume than its previous unexposed state, making it easier for them to be pushed. The easier it is for the long chain molecules to be pushed, the faster the writing speed becomes. For example, a ten fold increase in pushing efficiency results in a ten fold increase in writing speed.

Additionally, AFM tips of the prior art allow only motion along the z-axis which is useful for moving molecules or atoms but not very efficient for pushing molecular chains in a well controlled direction. As discussed previously, the tip needs to scan in the x- and y-directions ($\omega_x$ and $\omega_y$, respectively) as well as tilt toward the x- and y-axes (along angles θ and φ). In co-pending application Ser. No. 08/960,692, a mechanism for achieving the desired tip scanning and movement is discussed. Such a mechanism greatly facilitates the pushing of the molecular chains in a well controlled direction.

Figure 4A:
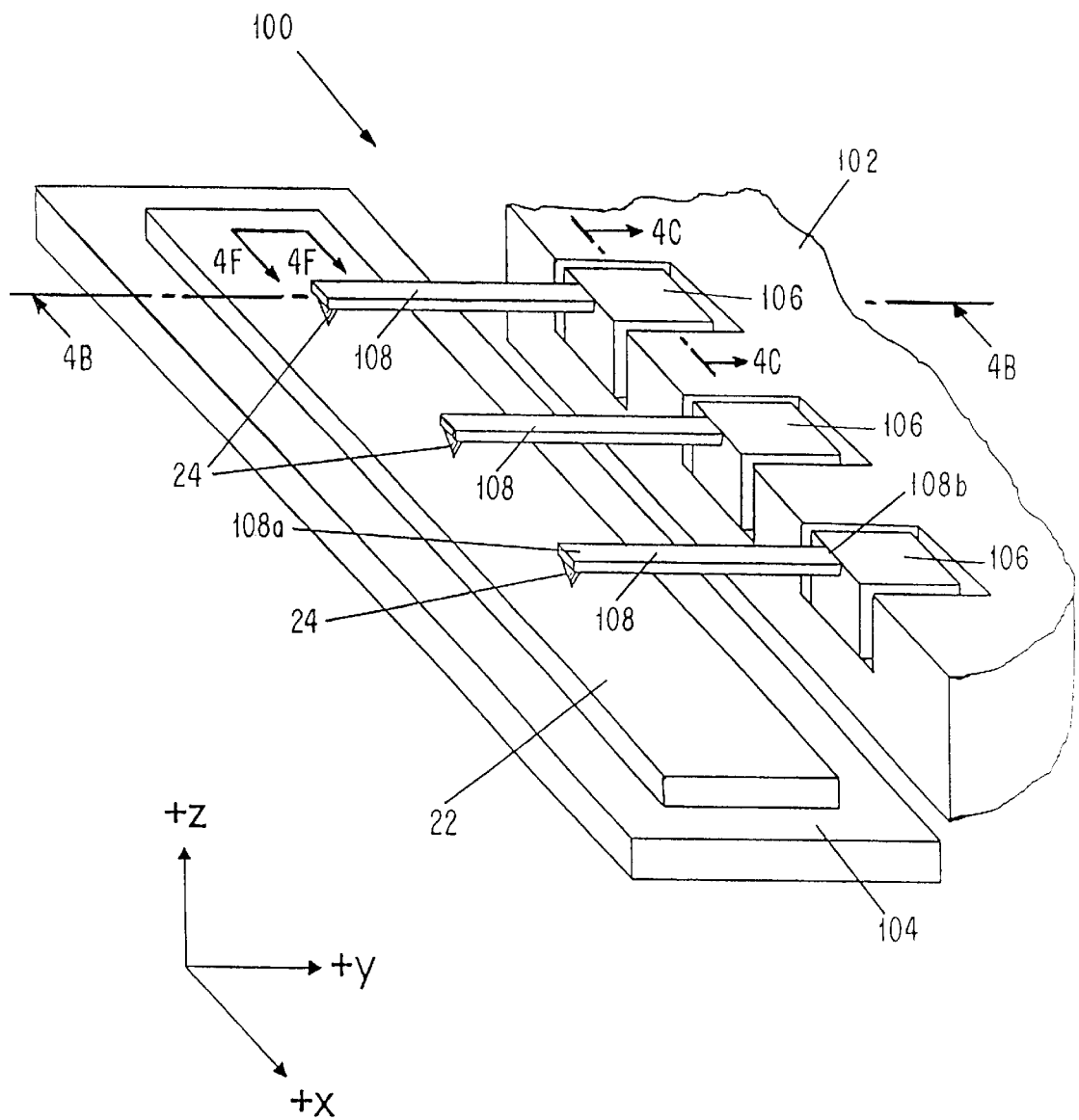
FIG. 4A illustrates a substrate plate having multiple goniometer tips.

Referring now to FIG. 4A, there is illustrated a substrate plate 102 having multiple tips 24. The plate is preferably fabricated from a silicon substrate. The plate 102 is preferably fixed and the substrate sits upon a three axis piezoelectric stage. However, the plate 102 can alternatively sit upon the three axis piezoelectric stage 104, with the substrate being fixed. The operation of the three axes stage 104 is well known in the art. The stage 104 provides scanning along the x-axis ($\omega_x$), scanning along the y-axis ($\omega_y$), and translation along the z-axis. The goniometer 106 has a cantilever 108 having a cantilevered end 108a and a supported end 108b. The goniometer 108 also has a tip 24 for writing onto a surface 22a of a substrate material 22. The tip 24 is controlled by the goniometer 106 and is connected to the goniometer 106 by the cantilever 108. The goniometers 106 preferably comprise a multi-layer structure shown in detail in FIG. 4B. The goniometers 106 are preferably fabricated simultaneously using conventional semiconductor fabrication methods. The cantilever 108 and tips 24 are also preferably fabricated simultaneously using conventional semiconductor fabrication processes.

Figure 4B:
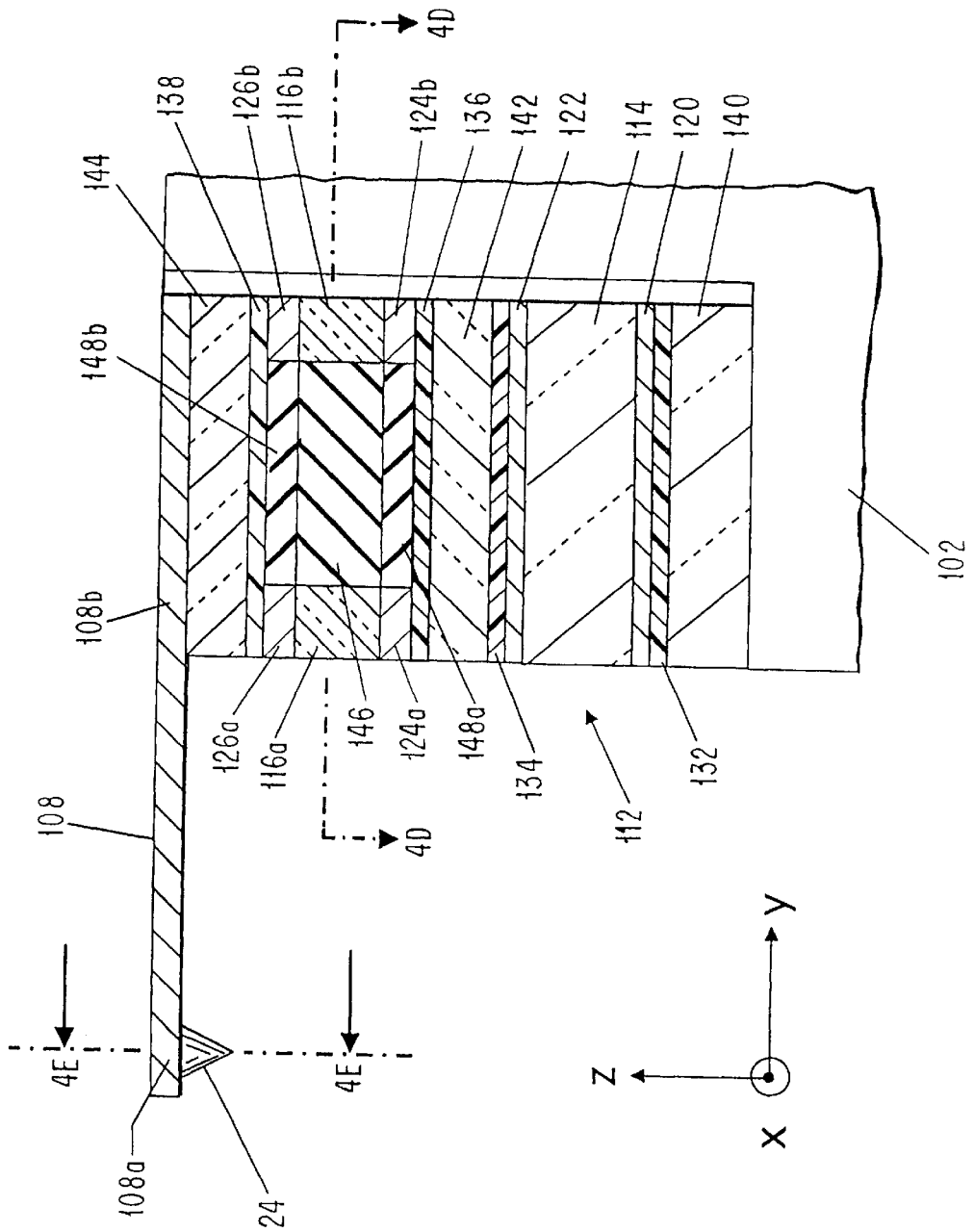
FIG. 4B illustrates a sectional view of the goniometer of FIG. 4A as taken along line 4B—4B.
Figure 4C:
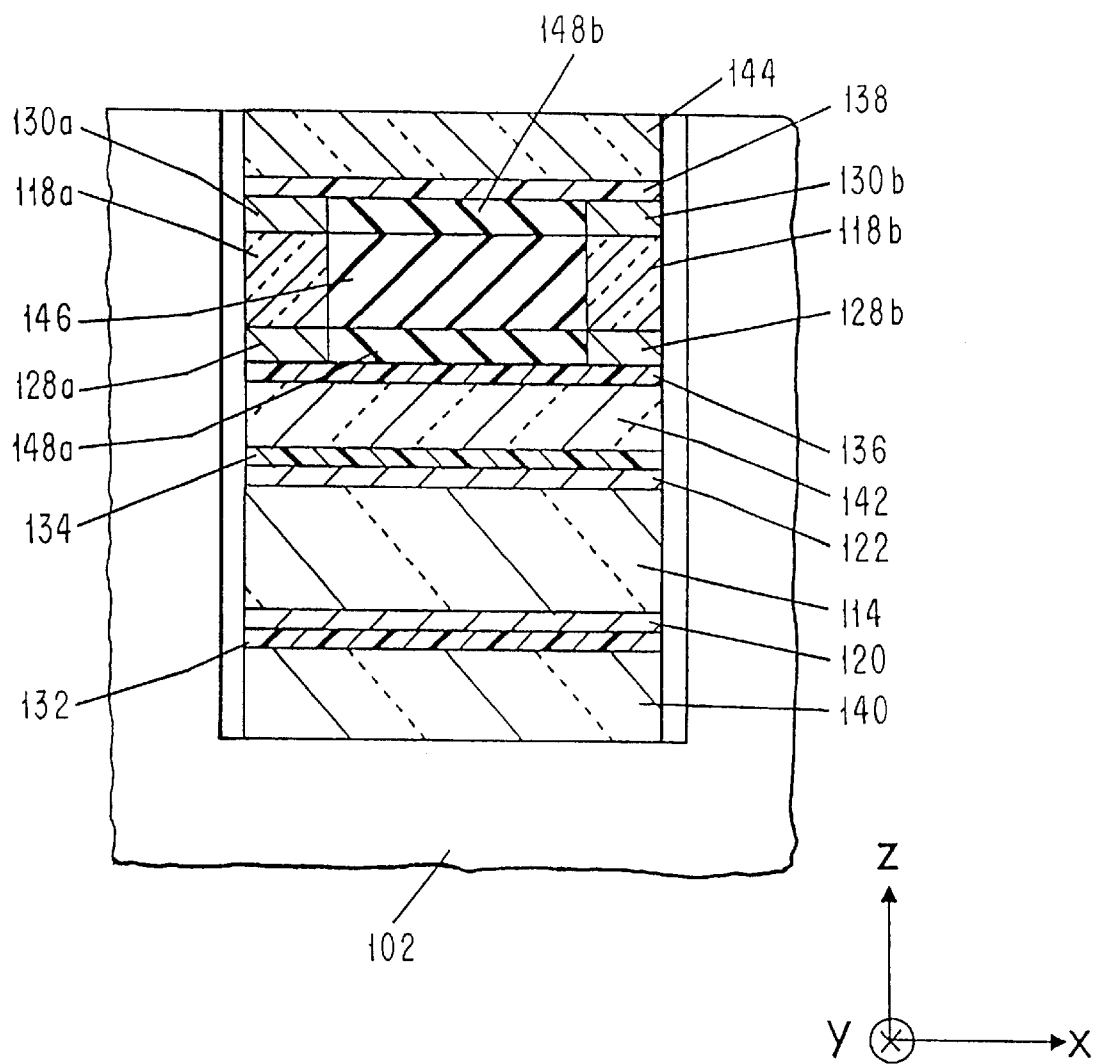
FIG. 4C illustrates a sectional view of the goniometer of FIG. 4A as taken along line 4C—4C.
Figure 4D:
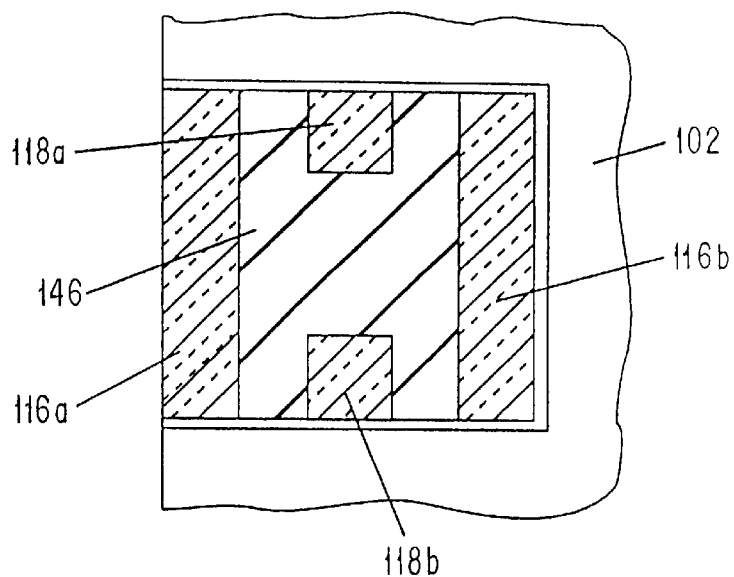
FIG. 4D illustrates a sectional view of the goniometer of FIG. 4B as taken along line 4D—4D.

Referring now to FIGS. 4B, 4C, and 4D in detail, there is shown the geometry of the multi-layer structure of the goniometer 106 necessary to accomplish the following three motions; translation in the z-direction, tilt about the y-axis, and tilt about the x-axis. The tip 24 is mounted on the cantilevered end 108a of the cantilever 108. The supported end 108b of the cantilever 108 is mounted on a multi-layer block 112. Layers 114, 116a, 116b, 118a, and 118b are first second, third, fourth, and fifth piezoelectric layers, respectively. The piezoelectric layers provide Z-axis translation, Y-axis tilt, and X-axis tilt, of the cantilever 108, and thus the tip 24, with the second and third piezoelectric layers 116a and 116b operating as a pair and the fourth and fifth piezoelectric layers 118a and 118b operating as a pair. A pair of electrodes surround each piezoelectric layer for actuation of the piezoelectric layers. A first pair of electrodes 120 and 122 surround and actuate the first piezoelectric layer 114, a second pair of electrodes 124a and 126a surround and actuate the second piezoelectric layer 116a, a third pair of electrodes 124b and 126b surround and actuate the third piezoelectric layer 116b, a fourth pair of electrodes 128a and 130a surround and actuate the fourth piezoelectric layer 118a, and a fifth pair of electrodes 128b and 130b surround and actuate the fifth piezoelectric layer 118b. Photo-imagable dielectric layers 132, 134, 136, and 138 insulate the electrodes as well as provide adhesion. The photo-imagable dielectric layers 132, 134, 136, and 138 may be single or multiple layers and are preferably fabricated from a photo-imagable epoxy. Inorganic dielectric layers 140, 142 may also be used to provide a planarized (i.e., smooth) surface to coat the next organic layer. Layer 144, preferably a suitable organic material may also be used. The dielectric layers 140, 142, and 144 are preferably fabricated from a relatively hard material such as silicon dioxide or silicon nitride. A first filler layer 146 is provided to insulate the second, third, fourth, and fifth piezoelectric layers 116a, 116b, 118a, and 118b, respectively, from each other. The first filler layer 146 is preferably an organic dielectric layer composed of materials such as polyimide or polysulfone. A second filler layer 148a insulates electrodes 124a, 124b, 128a, and 128b from each other. A third filler layer 148b insulates electrodes 126a, 126b, 130a, and 130b from each other. The second and third filler layers 148a, 148b are preferably composed of the same materials as the first filler layer 146.

Referring now to FIGS. 4A, 4B, 4C, and 4D the operation of the goniometer 106 will now be described. In order to achieve the desired angles of $\phi$ (0°, 90°, 180°, and 270°) different combinations of the second, third, fourth, and fifth piezoelectric layers 116a, 116b, 118a, and 118b are activated. To achieve an angle of $\phi=0°$, that is to tilt the tip axis 25 to-ward the positive x-axis, the fifth piezoelectric layer 118b is expanded by applying a potential difference between the fifth pair of electrodes 128b and 130b. This will cause the cantilever 108 and hence the tip 24 to tilt toward the positive x-axis which corresponds to $\phi=0°$. Alternatively, a greater potential can be applied between the fifth pair of electrodes 128b and 130b than is applied between the fourth pair of electrodes 128a and 130a causing the fifth piezoelectric layer 118b to expand larger than the fourth piezoelectric layer 118a, also resulting in the tip 24 titling toward the positive x-axis. To produce the conditions under which $\phi=180°$, that is to tilt the tip axis 25 toward the negative x-axis, the fourth piezoelectric layer 118a is expanded by applying a potential difference between the fourth pair of electrodes 128a and 130a. Alternatively, a greater potential can be applied between the fourth pair of electrodes 128a and 130a than is applied between the fifth pair of electrodes 128b and 130b causing the fourth piezoelectric layer 118a to expand larger than the fifth piezoelectric layer 118b, also resulting in the tip 24 titling toward the negative x-axis.

To produce the conditions under which $\phi=90°$, that is to tilt the tip axis 25 toward the positive y-axis, the third piezoelectric layer 116b is expanded by applying a potential difference between the third pair of electrodes 124b and 126b. Alternatively, a greater potential can be applied between the third pair of electrodes 124b and 126b than is applied between the second pair of electrodes 124a and 126a causing the third piezoelectric layer 116b to expand larger than the second piezoelectric layer 116a, also resulting in the tip 24 titling toward the positive y-axis. To produce the conditions under which $\phi=270°$, that is to tilt the tip axis toward the negative y-axis, the second piezoelectric layer 116a is expanded by applying a potential difference between the second pair of electrodes 124a and 126a. Alternatively, a greater potential can be applied between the second pair of electrodes 124a and 126a than is applied between the third pair of electrodes 124b and 126b causing the second piezoelectric layer 116a to expand larger than the third piezoelectric layer 116b, also resulting in the tip 24 titling toward the negative y-axis.

Another alternative for producing $\phi=0°$, 90°, 180°, and 270° is to normally apply a potential difference between sets of electrodes to cause the corresponding piezoelectric layer to normally be in an expanded state, and to contract the piezoelectric layer into its relaxed state by removing the potential between electrodes. For instance, the fourth and fifth piezoelectric layers 118a and 118b can be normally expanded by applying a potential difference between their respective sets of electrodes. To achieve $\phi=0°$, the fourth piezoelectric layer 118a is contracted by removing or decreasing the potential difference between the fourth pair of electrodes 128a and 130a resulting in a tilt toward the positive x-axis. Alternatively, a greater potential difference can be maintained between the fifth pair of electrodes 128b and 130b then is maintained between the fourth pair of electrodes 128a and 130a, resulting in the fourth piezoelectric layer 118a contracting more than the fifth piezoelectric layer 118b, also resulting in a tilt toward the positive x-axis.

The degree at which the tip axis is tilted toward the negative y or positive y axes determines angle $\theta$, which is the angle the tip axis makes with the z-axis. Therefore, $\theta$ will be determined by the difference in the amount of expansion of piezoelectric layers 116a and 116b.

The goniometer 106 also provides movement along the z-axis. This movement is more of a fine movement along the z-axis, with the stage 104 providing a coarse movement along the z-axis. Applying a potential difference between the first pair of electrodes 120 and 122 expands the first piezoelectric layer 114 from a relaxed position. The expansion provides movement along the Z-axis. Alternatively, the first piezoelectric layer 114 can be normally expanded and contracted toward its relaxed position when a potential difference between the first pair of electrodes 120 and 122 is removed or decreased.

This fine movement is necessary when scanning within a pixel 28. This is especially important if an array of tips is used, as shown in FIG. 4A, to control the writing operation of one tip independent from the other tips in the array. If only a single tip is being utilized for writing, then the z-motion of the stage 104 will serve the same purpose. After scanning in a direction within a pixel 28, the tip is lifted with the fine z-axis movement provided by the first piezoelectric layer 114, moved back to a starting position, and lowered, again with the fine z-axis movement provided by the first piezoelectric layer 114, before beginning another scan. For example, referring to FIG. 1B, the tip 24 starts at side 28c and is scanned in the negative y direction while it is in a lowered position corresponding to the first piezoelectric layer 114 being relaxed, which builds a pile 26 parallel to the x-axis on side 28d. After reaching side 28d, the tip is lifted, i.e., the first piezoelectric layer 114 is expanded, and the tip is returned to side 28c where it is again lowered and scanned toward side 28d. Concomitantly, while one tip 24 is writing, another tip 24 may be writing another pixel with a different set of $\omega_y$, $\omega_x$, $\theta$, and $\phi$ conditions. When moving the tip from pixel to pixel, the coarse z-axis movement provided by the stage 104 is utilized.

Figure 4E:
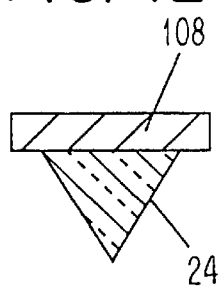
FIG. 4E illustrates a sectional view of the goniometer tip of FIG. 4B as taken along line 4E—4E.
Figure 4F:
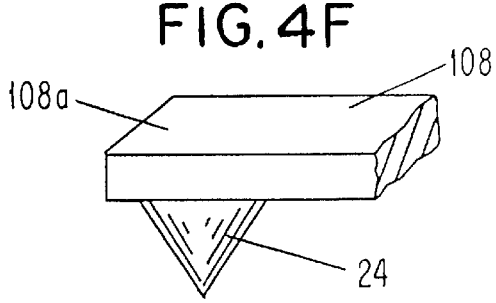
FIG. 4F illustrates a partial enlarged isometric view of the goniometer tip of FIG. 4A as viewed along line 4F—4F.
Figure 4G:
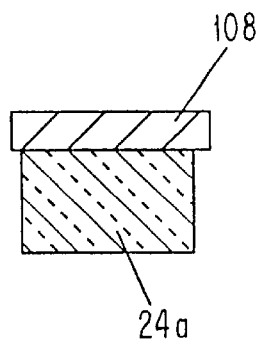
FIGS. 4G and 4H illustrate views of an alternate tip as they would be illustrated in FIGS. 4E and 4F, respectively.
Figure 4H:
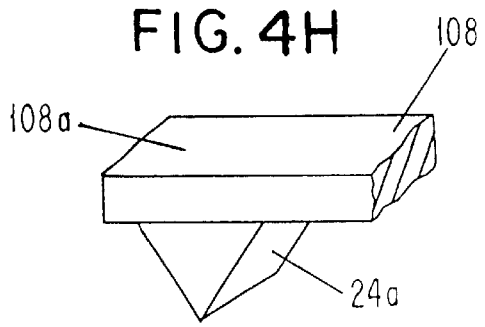

The tip is preferably fabricated from a hard material such as silicon nitride, tungsten carbide, or silicon dioxide, as is the cantilever. Tips of the prior art are pointed as is shown in FIG. 4E, which was necessary to move atoms. The points are achieved by either a conical shaped tip, as shown in FIGS. 4E and 4F, or a pyramid shaped tip (not shown). However tips of different geometry have been found to be more efficient at moving molecular chains, one such configuration is shown in FIGS. 4G and 4H in which a knife edge tip 24a is shown. Instead of being pointed, tip 24a has a knife edge which is more useful for moving long chain molecules. However, the knife edge tip 24a is only useful when scanning in one direction, resulting in parallel piles 26.

As discussed earlier and shown in FIGS. 1A and 1B, it can be seen that the bit occupies a pixel 28 of the substrate surface 22a. The molecular piles 26 can be moved to locations around the periphery of the pixel to form one of 16 bit configurations.

Referring to FIG. 5, there is illustrated the sixteen different bit configurations possible, referred to by reference numerals 1–16 respectively. The molecular piles can be moved to achieve all of the possible configurations shown by varying the variables discussed previously, namely $\omega_y$, $\omega_x$, $\theta$, and $\phi$. The variables needed to achieve each of the sixteen bit configurations are listed in table 1.

Fifteen of the configurations (reference numerals 2–16 in FIG. 5) are achieved by pushing the molecular piles 26 to different sides 28a, 28b, 28c, and

TABLE 1

| Pile Configuration | $\omega_x$ | $\omega_y$ | $\phi$ | $\theta$ |
|---|---|---|---|---|
| 1 | — | — | — | — |
| 2 | low | high | 270° | ≧5° |
| 3 | low | high | 90° | ≧5° |
| 4 | low | high | — | 0° |
| 5 | high | low | 0° | ≧5° |
| 6 | high | low | 90° | ≧5° |
| 7 | high | low | — | 0° |
| 8 | successive combination of 2 and 5 | | | |
| 9 | successive combination of 2 and 6 | | | |
| 10 | successive combination of 2 and 7 | | | |
| 11 | successive combination of 3 and 5 | | | |
| 12 | successive combination of 3 and 6 | | | |
| 13 | successive combination of 3 and 7 | | | |
| 14 | successive combination of 4 and 5 | | | |
| 15 | successive combination of 4 and 6 | | | |
| 16 | successive combination of 4 and 7 | | | |

28d along the periphery of the surface pixel 28. The sixteenth bit (reference numeral 1 in FIG. 5) is a null pixel, having no molecular piles 26.

Additionally, configurations 2–7 are achieved in a single operation using the variables listed in table 1. Configurations 8–16 are achieved by successive operations used to achieve configurations 2–7. For example, configuration 8 is achieved by successively forming combinations 2 and 5 within the same pixel 28.

These molecular pile 26 configurations allow a single bit to be written in sixteen different ways making the data naturally base sixteen, thereby improving the storage density by sixteen fold over binary data storage.

Figure 6:
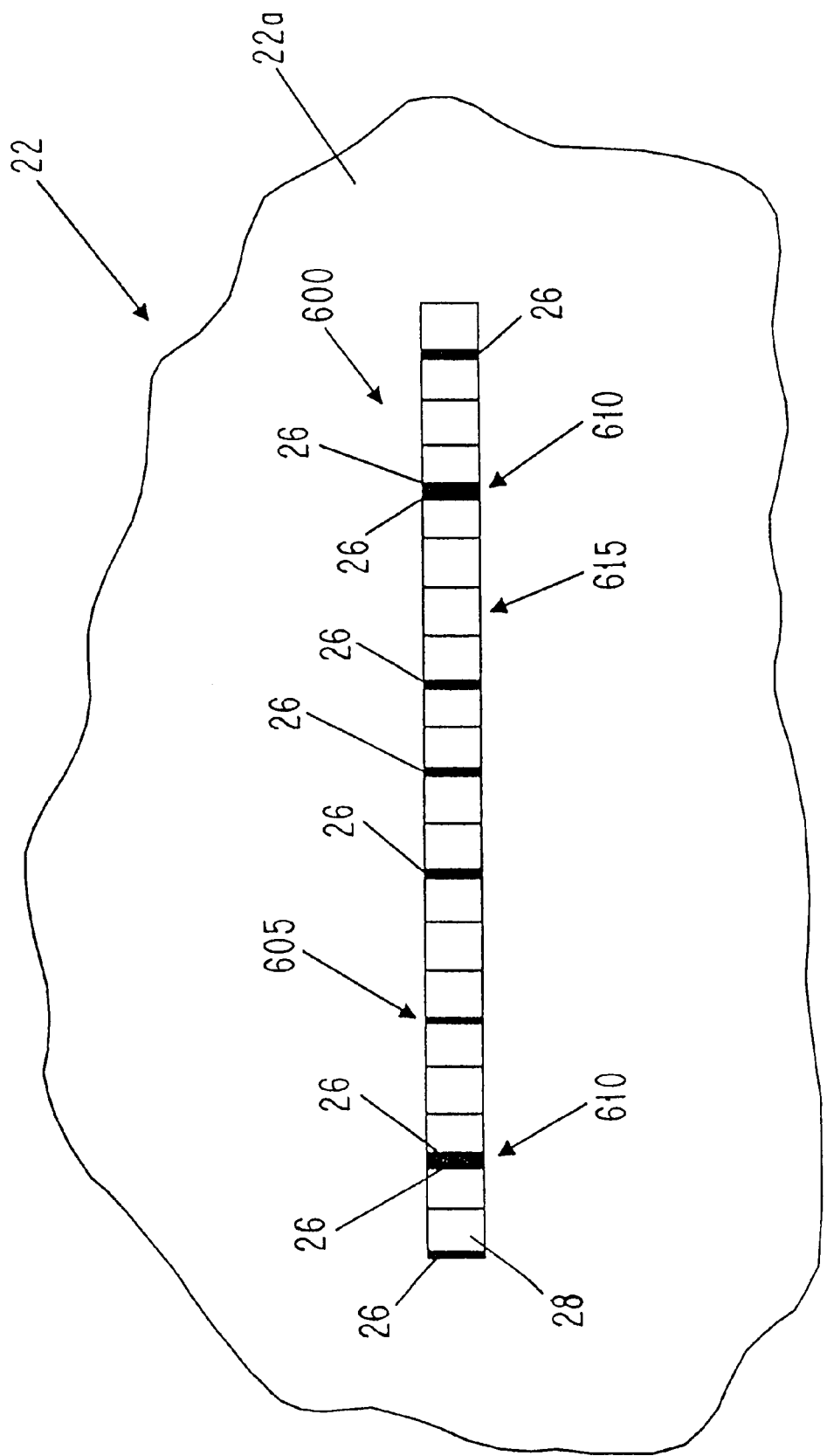
FIG. 6 illustrates a molecular bar-code disposed on the surface of a silicon wafer chip.

Referring now to FIG. 6, there is illustrated a molecular bar-code, referred to generally by reference numeral 600. The bar code is formed on the surface 22a of a substrate 22 using the method of the present invention. Bar-codes of this type can be made very small, and can be written by the method of the present invention and read using conventional methods known in the art.

An application for the molecular bar-code 600 is illustrated in FIG. 6 in which the bar-code 600 is disposed on the surface 22a of a silicon wafer 22. Silicon wafers typically have a layer of polyimide on their uppermost surface which make them ideal for the molecular chain manipulation of the present invention.

There are several steps (gates) which a silicon wafer goes through during its fabrication. Each step can be performed by different processing equipment to achieve the same end result. In a given fabrication line, each wafer, in principle, can undergo processing at different process conditions, for example, at different deposition temperatures. Therefore, silicon wafers from the same fabrication lines and processing equipment can undergo a combination of different processes used in their fabrication. The processes that each silicon wafer undergoes is typically recorded, in an extensive process known in the art as "bookkeeping." Bookkeeping is necessary when determining which processes make for a higher quality wafer. However, the bookkeeping process can be quite expensive.

The molecular bar-code 600 illustrated in FIG. 6 can contain the bookkeeping information under which the silicon wafer was fabricated. It can be placed on the wafer in a compact form and since it is placed on the silicon wafer to which it refers, the need to cross-reference or match-up silicon wafers with respective bookkeeping records is eliminated.

FIG. 6 shows a series of pixels 28 arranged side by side on the surface 22a of a silicon wafer 22. Molecular piles 26 are formed within the pixels as described above to form a series of parallel lines, the lines being the piles 26 themselves. The bar-code can a contain a combination of thin lines 605 made up of a single pile 26, thick lines 610 made up of two piles 26 formed on the sides of two adjacent pixels 28, or null pixels 615. Each combination of thin lines, thick lines, and null pixels is used to contain the bookkeeping information used in the silicon wafers fabrication. Since the bar code contains only parallel piles 26, the knife edge tip 24a of FIGS. 4F and 4G are particularly useful.

From the foregoing, it becomes readily apparent to one skilled in the art that the novel storage media of the present invention offers increased storage density at high recording rates. Due to the inventive media surface manipulation the advantages offered by the inventive structure resides in:

(a) a writing technique whereby AFM is used, not to damage the media surface, but to alter its topography;

(b) a single bit may be written in sixteen different ways making the data naturally base 16 thereby improving the storage density by sixteen fold;

(c) the surface topography can be replicated by conventional, inexpensive transfer techniques to mass produce disks from a single master disk thereby improving the writing speed by several orders of magnitude;

(d) writing to the media may be performed at room temperature and atmospheric pressure instead of the very cold temperatures and vacuum needed in the methods of the prior art; and (e) writing can be done on relatively inexpensive polymer substrates instead of the single crystal surfaces of the prior art.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new and desire to secure by Letters Patent is:

1. A method for storing information comprising the steps of:
    selecting a material substrate having an upper surface, the upper surface having molecules with a molecular weight greater than 5,000, the molecules further having chain ends; and
    pushing molecules on said upper surface into a molecular pile at selected locations.

2. The method of claim 1, further comprising the steps of:
    exposing the upper surface to radiant energy pulses at an energy below the ablation threshold, and
    heating said surface whereby the molecules are at a temperature well above the glass transition temperature to rearrange the molecules by bringing their chain ends to said upper surface.

3. The method of claim 1, wherein the pushing step is performed by an atomic force microscope having a tip.

4. The method of claim 3, further comprising the step of tilting the AFM tip relative to the upper surface for facilitating the pushing of molecules.

5. The method of claim 1, wherein the molecules are pushed into one of sixteen different pile configurations around the periphery of a pixel on the upper surface.

6. The method of claim 1, wherein the selected material is a polymer selected from the group consisting of polyimide, polyamide, polyester, polycarbonate, polyolefin, polyether ketone, polyether, polyacrylate, photo cross linked polymers, and mixtures thereof.

* * * * *